Feb. 3, 1970　　　E. M. KEEN ET AL　　　3,492,971
LAYING CAGE AND SYSTEM

Filed July 12, 1967　　　FIG.1　　　4 Sheets-Sheet 1

INVENTORS
EVERETT M. KEEN
ANTHONY J. SICILIANO

BY  Albert H. Kirchner

ATTORNEY

INVENTORS
EVERETT M. KEEN
ANTHONY M. SICILIANO

10

United States Patent Office 3,492,971
Patented Feb. 3, 1970

3,492,971
LAYING CAGE AND SYSTEM
Everett M. Keen and Anthony J. Siciliano, Millville, N.J., assignors, by mesne assignments, to Diamond International Corporation, New York, N.Y., a corporation of Delaware
Filed July 12, 1967, Ser. No. 652,859
Int. Cl. A01k *31/14, 31/06*
U.S. Cl. 119—18                    9 Claims

ABSTRACT OF THE DISCLOSURE

A cage for laying hens or other poultry has a front wall, preferably made of wire mesh, formed with an outwardly, i.e., forwardly, offset upper portion, thus enlarging the front upper zone of the enclosure to accommodate the head, neck and breast of a forwardly facing standing bird, and a feed trough is disposed outside the cage along the inwardly offset lower portion of the front wall, with a water trough disposed along the outer edge of the feed trough, so that the troughs take up no room inside the cage, access by the birds is facilitated, and contamination of the water and feed is reduced to a minimum.

---

The present invention relates to poultry cage systems, i.e., to batteries or the like comprising a plurality of cages arranged in a series of side by side individual cage units with a means common to the series for providing the encaged birds with a continuous supply of feed and water.

Systems of this general type are common and well known and extensively used, but the best of them, so far as we are aware, are subject to certain structural and functional disadvantages generally involving undue crowding of the birds, making it difficult to maintain high standards of cleanliness in the feed and water supplies, and impeding access by the birds to the feed and water supplies.

The principal objects of the invention are to improve the cage structure so as to eliminate the foregoing and other related defects and disadvantages.

In general, these objects are accomplished by arranging the feed and water supply in two troughs both of which are disposed outside the cage, both at substantially the same level, so as to minimize scattering of feed into the water and dripping of water into the feed, and by forming the cage wall along which these troughs are mounted so as to have an outwardly offset upper portion and in inwardly offset lower portion. The troughs, or at least the inner, feed supply trough, are contained within the inset along the bulge formed by the projected upper portion of the wall, and the intermediate part of the wall that connects the two portions forms a protruding extension of the cage enclosure that accommodates the head, neck and breast of each bird standing inside the cage and facing the wall preparatory to extending its head out through openings in the wall and into the water and/or feed trough.

A preferred embodiment of the invention which has been produced commercially and found to be entirely satisfactory in operation, and which is accordingly at present preferred, is illustrated in the accompanying drawings, in which.

Figure 1:
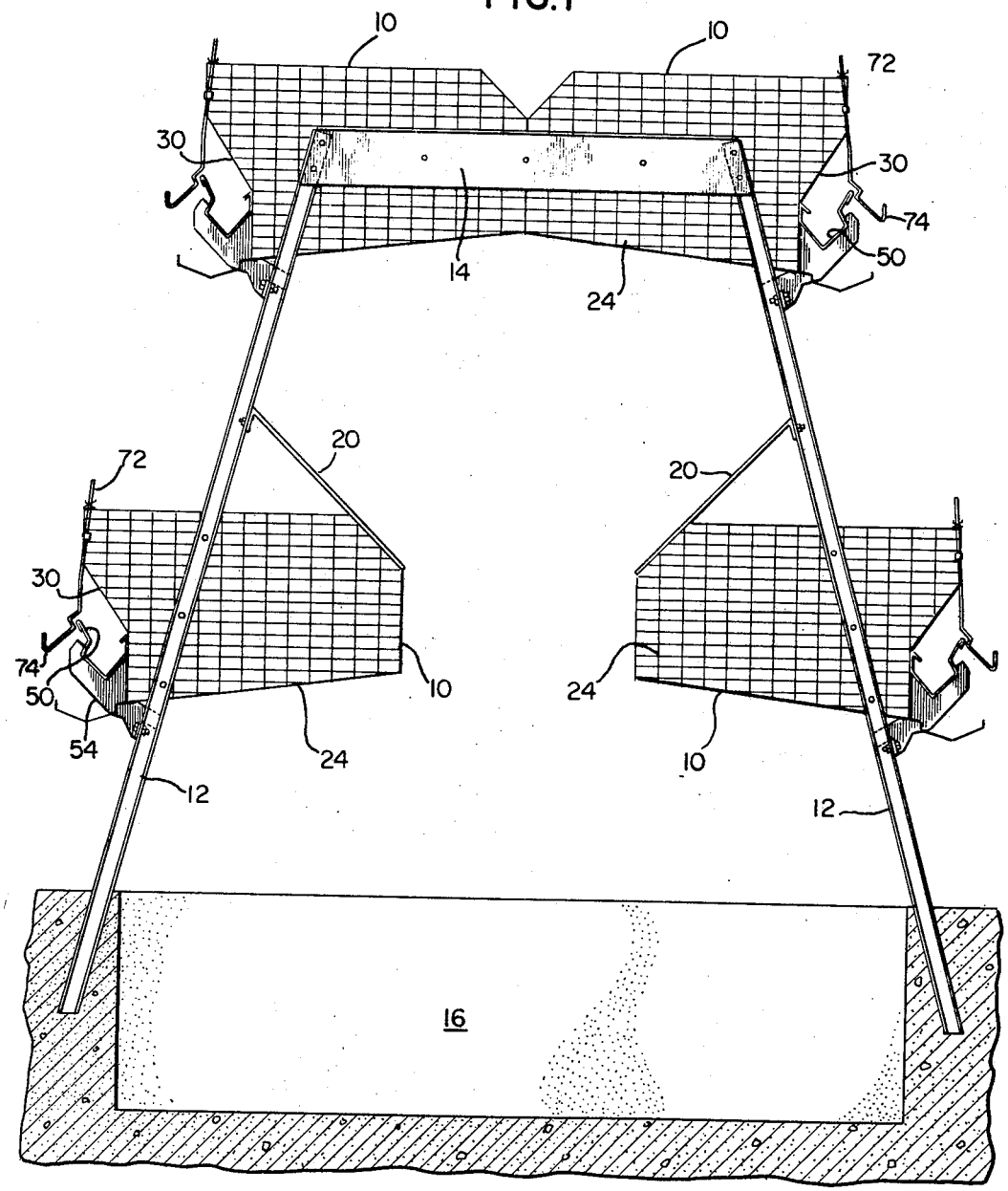
FIGURE 1 is an end elevational view of a battery or system showing a two-tier assembly of cages each constructed in accordance with the present invention, and showing the new arrangement of feed and water troughs incorporated in the system.

FIG. 1 depicts a suggested arrangement for assembling into a battery or system a plurality of the individual cages constituting the invention. Other combinations and associations of the cages are possible and contemplated. It is to be understood that the inventive principles are concerned with the cage per se, and more particularly with the front wall of the cage and the association of the feed and water supply means therewith for serving a whole line of side by side cages, as will now be explained.

In FIG. 1 the reference numeral 10 designates each one of a plurality of identical cages which are, in this preferred type of installation, assembled in side by side relation in horizontal rows or tiers and mounted on a suitable framework such as may be provided by the uprights 12 and cross member 14 forming the inverted truncated V-structure shown.

Each cage is made of standard stout wire mesh panels which are connected at their edges to form an enclosure of generally rectangular shape in plan comprised of a floor, a roof, back wall and two side walls, all of conventional construction, assembled in a well known manner as by sheet metal clips 18 (see FIG. 2) clamping adjacent wire runs of contiguous panels. If the system is to consist of two tiers and span a droppings pit 16 that is relatively narrow, it is convenient to form the side walls with cut-off upper corners at the rear, and shorten the roof and back wall panels, so that sloping shields 20 can be mounted over those portions of the lower tiers that are directly beneath the floors of the upper tier, to protect the lower cages from droppings falling from above. In other installations, where the rows of the lower tier are spread farther apart, the cut-off corners and shields will not be necessary.

Figure 2:
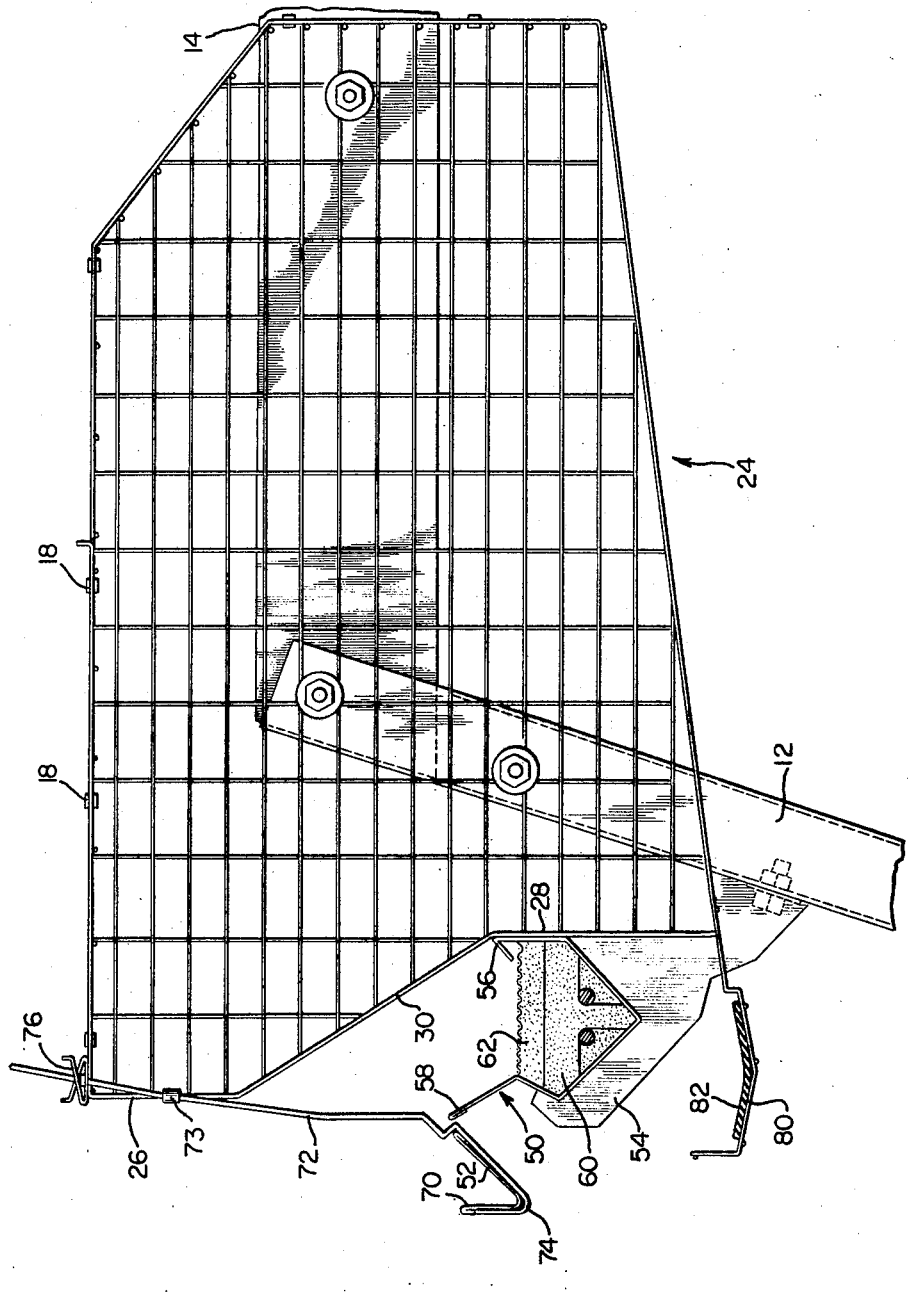
FIG. 2 is a side elevational view of one of the cages of the system of FIG. 1, on a relatively enlarged scale.

The side panels of the new cages, designated generally 24, one of which is best shown in its entirety in FIG. 2, are all identical and each is of special shape to cooperate with the new front walls. This new shape consists in extending the front edge of the upper portion of the side wall forwardly and correspondingly retracting the front edge of the lower portion rearwardly, the two portions being connected by a downwardly and rearwardly sloping intermediate portion, all as shown in FIG. 2 where the portion of wire that defines the outwardly offset upper edge portion of the side wall is designated 26, the portion of wire at the inwardly offset lower edge portion is designated 28, and the portion of wire at the intermediate edge portion is designated 30.

Figure 3:
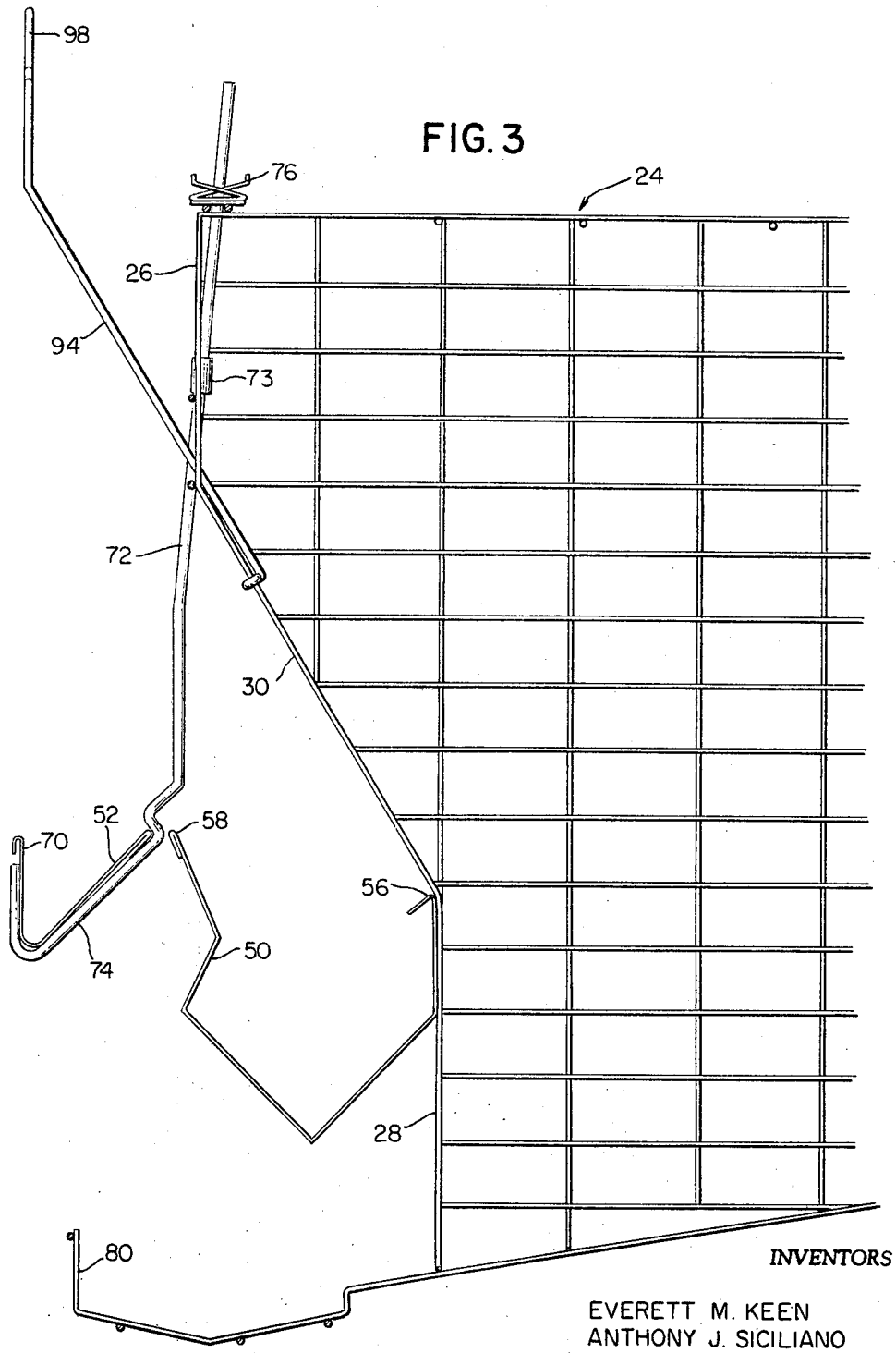
FIG. 3 is a side elevational view of the front or forward portion of the cage of FIG. 2, on a still further enlarged scale.

While dimensions and proportions are not precisely critical, it is important that they be determined with relation to the size of the birds that are to be encaged. Thus, in the illustrated example of the invention, in which each cage is designed for occupancy by four laying hens, the side wall panels may be made of 2" x 1" galvanized mesh cut to have a forwardly and downwardly sloping bottom edge 24 inches from front to rear, a height of 16 or 17 inches, a lower front edge 28 six inches high, an upper front edge 26 four inches high, and an intermediate connecting edge portion 30 six or seven inches high sloping back four inches from top to bottom, as shown in FIG. 3.

Figure 4:
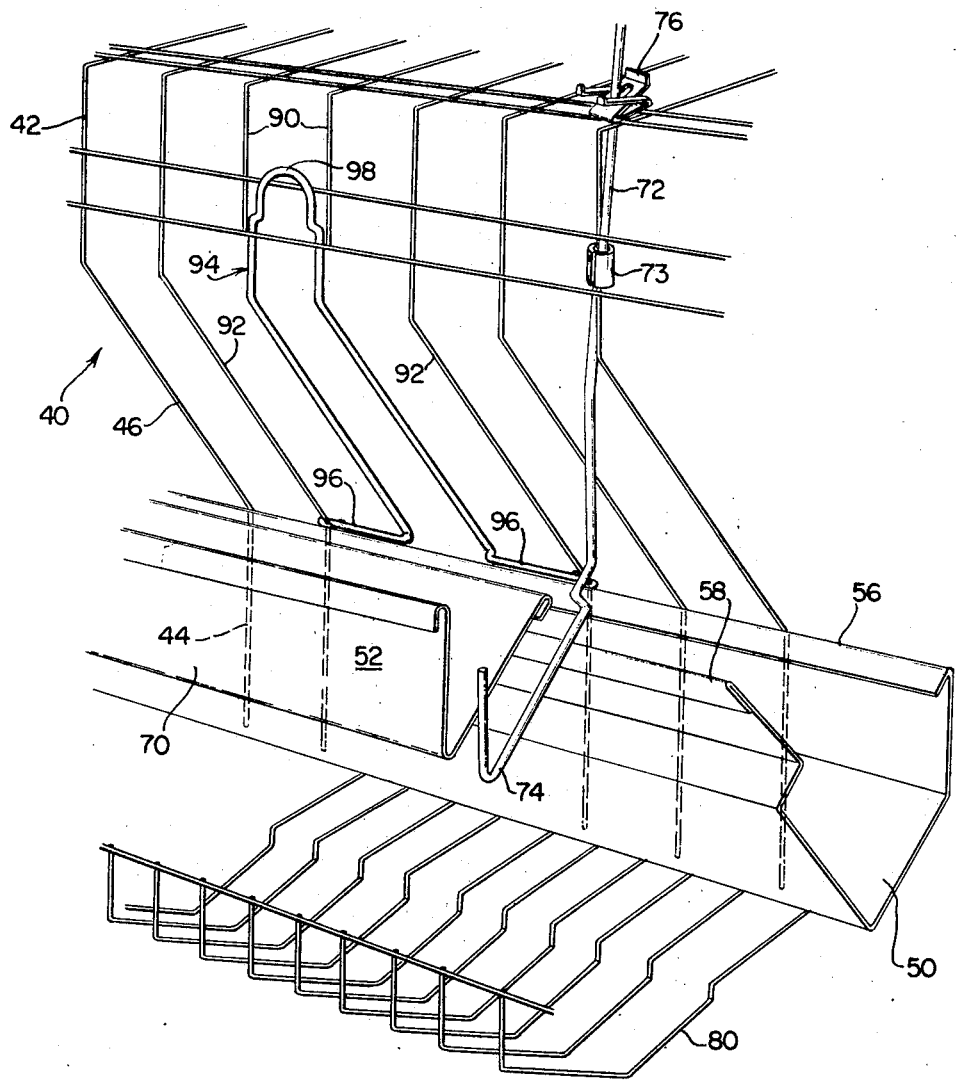
FIG. 4 is a perspective view of the front wall of the cage showing the appurtenant feed and water troughs and the egg collecting trough.

The two side walls of such a cage are set 12 inches apart and are connected by a front wall structure designated generally 40 and shown in FIG. 4. This wall structure is formed mainly of stout wires disposed in parallel vertical planes and bent to conform to the outline of the front edges of the two side panels 24. Hence there wires, which may be extensions of the mesh wires of the roof panel as shown in FIG. 4 or may be assembled separately as a panel which is clipped to the cooperating roof, floor and side panels, form a panel structure which comprises relatively offset upper and lower portions connected by a sloping intermediate portion. In FIG. 4, the upper, outwardly offset portion is shown at 42, the lower, inwardly offset portion portion is shown at 44, and the sloping intermediate or connecting portion is shown at 46.

While the front wall would normally connect the two side walls of a single cage unit, it will be obvious that in an elongated system of many cage units set side by side, each unit may consist of but one side wall, so that each front wall will connect the single side wall of its one cage unit with the single side wall of the next adjoining unit. This elimination of duplicated side walls is well known in the art.

It will be evident from the foregoing that the cage enclosure is forwardly enlarged in its upper zone, so that a bird will be able to stand on the floor with its feet quite close to the lower portion 44 of the front wall 40 because in such position the bird's breast will fit into the enlargement, being accommodated by the outwardly and upwardly sloping intermediate portion 46 of the front wall, with the head and neck fitting into the upper part of the enlargement, up against the outwardly offset portion 42 of the front wall.

Birds stand in this position in the new cage structure when feeding or drinking from supply troughs mounted outside the cage as will be explained. In prior art cages in which the whole front wall is uni-planar it is necessary for the birds to stand with their feet well back from the front edge of the floor in order to obtain access to feed and water outside the cage, so that considerable area of the floor is actually unused. The new forwardly and upwardly enlarged cage space of the present invention thus more efficiently accommodates the birds, when feeding, drinking or for any other reason standing forwardly facing in the cage, than did the strictly box-like shapes of the prior art cages.

Intimately cooperating with the new front wall design of the invention are the feeding and watering means.

These comprise a feed trough 50 and a water trough 52, both extending horizontally along the whole series of cages froming a single row. The feed trough may be generally of known shape, nested in supporting brackets 54 bolted to the framework uprights 12 and so shaped and disposed as to mount the trough snugly up against the lower, inwardly offset portion 44 of the front wall 40, in the recess or depression in that wall underlying the intermediate portion 46 which slopes upwardly and outwardly to connect with the upper, outwardly offset portion 42. The relation of the trough to the front wall is such that the inner edge 56 of the trough is aligned along the top edge of the lower portion 44 of the front wall. The outer edge 58 of the feed trough is preferably made higher than the inner edge, extending upwardly an inch or so above the level of the inner edge and lying substantially in the vertical plane of the front wall upper portion 42.

The feed trough is best provided with an endless chain type conveyor 60 having a series of spaced flights for propelling a quantity of feed 62 from a supply hopper constantly along the trough, in accordance with common practice in cage systems.

The water trough 52 in the presently illustrated embodiment of the invention consists of a series of sections 70 of stainless steel or equivalent material aligned lengthwise, with the edges of contiguous sections overlapped and caulked to a watertight fit. The placement of the trough is important. As shown in FIGS. 2 and 3, the water trough, which may be considerably more shallow than the feed trough 50, is mounted immediately outside the feed trough, with its inner edge substantially abutting the outer edge 58 of the feed trough and at the same level. The mounting may be by means of a series of supporting rods 72 spaced along the cage system and slidably joined to certain of the front wall wires by ferrules 73, each rod being formed at its lower end with an inverted hook 74 in which the trough is seated and having its upper end portion projecting through the cage roof and held in place, for fine vertical adjustment, by a spring pressed friction clamp 76, which may be soldered to the roof wires or may simply rest thereon, being too large to pass through the mesh. Thus the water trough can be adjusted into accurately horizontal level position so that a uniform depth of water can be maintained in it along its entire length. Water can be supplied from a float-controlled sump at one end of the installation in a well known manner.

The wires of the sloping floor of the cage may terminate in an extension 80 forwardly projecting beneath the feed trough 50 for receiving and supporting a conventional conveyor belt 82 which is operated from time to time to remove eggs laid by the birds which roll out through the open lower front wall portion 44.

The special arrangement of the water and feed troughs by which both are disposed outside the cage system and the water trough is set immediately adjacent to the feed trough, out beyond the feed trough and at the level of the outer edge thereof, is productive of distinct advantages. Among these are a very great reduction in contamination of the water by particles of feed scattered from the feed trough and contamination of the feed by water splashed or otherwise escaping from the water trough. Such admixing of the water and feed, caused by the birds themselves or by malfunctioning of one or the other of the supply means resulting in overflow of the water or feed, has long been a problem in the use of those systems in which the two troughs or other supply means were disposed one above the other. Moreover, inasmuch as the water trough generally requires cleaning oftener than the feed trough, placement of the water trough outermost in the system facilitates access of the attendant and use of the brushes, wiping cloths, etc. Designing the water trough with its front edge slightly lower than its rear edge eliminates trouble from accidental overflow.

A very important advantage of the new arrangement is the facility with which the birds have access to the feed and water. As a bird stands in the front of the cage, with its feet up much closer to the front wall than is possible in any cage having a uni-planar front wall, it is entirely normal and natural for the bird to project its head out through the vertical slots of the intermediate portion 46 of the front wall and down into either of the two troughs. And of course this access to both of the troughs is made without change in the bird's position.

It may be pointed out here that, while there are decided advantages separately and independently obtained in the offset front wall portions and in the side by side single level feed and water troughs, so that the invention may be considered to reside in each of these features alone, whether or not the other be also incorporated in the system, there is real cooperation between the two features. Thus it is the combination of offset upper and lower portions of the new front wall that really makes practical the single level arrangement of the two troughs because it becomes possible for the first time with such a front wall for each bird to stand sufficiently far forward in the cage to reach not only the immediately adjacent feed trough but also the more distant water trough. A bird projecting its head and neck through a conventional uni-planar front wall must stand back inside the cage sufficiently far behind the plane of the wall that stretching beyond the width of a single trough is difficult or impossible.

It is believed that the principal advantages of the new construction will be sufficiently evident to those skilled in the art from the foregoing description of the preferred embodiment which is illustrated in the drawings.

It remains only to explain that any suitable provision of doorways for the cages may be made to permit entry and removal of the birds. FIG. 4 illustrates a preferred arrangement. This includes removal or elimination of the two central wires 90 in the intermediate portion 46 of the front wall, thereby providing a space some six inches wide between the remaining two parallel adjacent wires 92. This doorway space is covered by a door 94 which consists of a single stout wire bent as shown in FIG. 4 to provide two parallel runs spaced and shaped to fit the opening left by removal of the wires 90, with laterally outstanding lower ends looped around the wires 92 for sliding thereon and with an upper end bight 98 having shoulders at its connection with the parallel portions of the wire so as yieldably to hook the door beneath one of the horizontal wires in the front wall upper portion 42. Thus, by appropriate pressure the bight may be freed from its normal abutment against the horizontal wire and the door may be slid upwardly to uncover the whole doorway opening.

It is believed that those skilled in the art will adequately understand the essential principles of the invention and the best mode of practicing it from the foregoing description and accompanying illustration of the preferred embodiment.

It is to be understood that specific changes are contemplated in this preferred embodiment within the broad scope of the invention as defined by the appended claims. Thus, for example, while the water supply means is preferably an open trough, maintained at an accurately horizontal level and provided with float-controlled input valve means as herein shown and described, the broad principles of the invention are not limited to inclusion of such a trough but contemplate and include substitution of an alternative kind of water supply means consisting of a main in the form of a pipe extending along the outer edge of the feed trough, in the same location as the water trough 52, connected to and supplying individual separate drinking cups located at spaced intervals along the series of front walls of the cage system, as shown, for example, in Spencer Patent No. 3,333,575. Each such cup may have the water level in its controlled by a float valve in the cup, or by the head of water in the pipe determined by the pipe input pressure, and a cup may be attached to the main in the central front of each cage to service the birds in that cage, so that the system will include as many cups as cages, or a cup may be located opposite the junction of each alternate pair of adjoining cages, so that the system will contain half as many cups as cages. The latter arrangement, which involves some saving in construction and maintenance, has been found adequate because the birds very readily learn the location of the accessible cup, and they spend very little time in the act of drinking so that at no time is there any objectionable crowding at any cup.

We claim:

1. In a poultry cage system, a cage unit comprising an enclosure having a floor, a roof, side and rear walls, and a front wall extending generally upright the full distance between said floor and roof, said front wall comprising offset upper and lower portions, including a forwardly projected upper vertical portion, a rearwardly retracted lower vertical portion, and a downwardly and rearwardly sloping intermediate connecting portion, said upper and intermediate portions thereby forming an enlargement in the front upper zone of the enclosure.

2. In a poultry cage system, a cage unit as claimed in claim 1 including a feed trough disposed along the outer face of the lower portion of the front wall and a water trough disposed along the outer edge of the feed trough and at substantially the level thereof.

3. In a poultry cage system, a cage unit comprising an enclosure having a floor, a roof, side and rear walls, and a front wall extending generally upright between said floor and roof, said front wall comprising offset upper and lower portions, including a forwardly projected upper portion and a rearwardly retracted lower portion, thereby forming an enlargement in the front upper zone of the enclosure, a feed trough disposed along the outer face of the lower portion of the front wall, and a water trough disposed along the outer edge of the feed trough having its upper edges at substantially the level of the upper edges of the feed trough.

4. In a poultry cage system, a cage unit having a front wall, a feed trough disposed along the outer face of the lower portion of said wall, and a water trough mounted parallel to and outwardly of the feed trough along the outer edge thereof, with its upper edges at substantially the level of the upper edges of the feed trough.

5. In a poultry cage system, a cage unit having a front wall, a feed trough disposed along the outer face of the lower portion of said wall, a water trough, and means mounting the water trough for vertical adjustment parallel to and outwardly of the feed trough and along the outer edge thereof.

6. In a poultry cage system, a cage unit comprising an enclosure having a floor, a roof, side and rear walls, and a front wall extending generally upright between said floor and roof, said front wall comprising offset upper and lower portions, including a forwardly projected upper portion an a rearwardly retracted lower portion, thereby forming an enlargement in the front upper zone of the enclosure, a feed trough disposed along the outer face of the lower portion of the front wall, and a water trough disposed outwardly beyond the feed trough, along the outer edge of the feed trough, and at substantially the level thereof.

7. In a poultry cage system, a cage unit comprising an enclosure having a floor, a roof, side and rear walls, and a front wall extending generally upright between said floor and roof, said front wall comprising offset upper and lower portions and a rearwardly retracted lower portion connected by a downwardly and rearwardly sloping portion thereby forming an enlargement in the front upper zone of the enclosure, said front wall being formed of a plurality of laterally spaced fixed wires disposed in parallel upper and lower vertical planes and an intermediate connecting sloping plane, two of said fixed wires in said sloping and upper portions being spaced substantially far apart to provide a doorway, and a door comprising a pair of parallel wire lengths each having an upper vertical portion and a lower sloping portion normally closing said doorway, connected at their upper ends and having their lower ends formed with horizontal extensions terminating in eyes looped around said two named fixed wires in the sloping portion, whereby said door may be slid upwardly and outwardly to uncover the doorway and downwardly and inwardly to close it.

8. In a poultry cage system, a plurality of cage units arranged side by side and each having a front wall, a feed trough disposed along the outer face of the lower portion of the series of front walls, and water supply means mounted parallel to and outwardly of the feed trough, extending along the outer edge thereof, and at substantially the level of the feed trough.

9. A poultry cage system as claimed in claim 8 in which the water supply means comprises a main pipe extending along the outer edge of the feed trough and drinking cups connected to said pipe and located at spaced intervals along the series of front walls of the cages.

References Cited

UNITED STATES PATENTS

| 2,756,721 | 7/1956 | Hayes | 119—48 |
| 2,931,334 | 4/1960 | Hammond | 119—18 |
| 3,208,430 | 9/1965 | Ernst | 119—18 |
| 3,274,972 | 9/1966 | Keen et al. | 119—48 |
| 3,313,271 | 4/1967 | Graves | 119—48 |
| 3,333,575 | 8/1967 | Spencer | 119—75 |

ALDRICH F. MEDBERY, Primary Examiner